(12) United States Patent
Mead

(10) Patent No.: US 8,627,921 B2
(45) Date of Patent: Jan. 14, 2014

(54) EXHAUST FILTER

(76) Inventor: Barry Mead, Grays (GB)

(*) Notice: Subject to any disclaimer, the term of this patent is extended or adjusted under 35 U.S.C. 154(b) by 0 days.

(21) Appl. No.: 13/259,638

(22) PCT Filed: Mar. 22, 2010

(86) PCT No.: PCT/GB2010/050474
§ 371 (c)(1),
(2), (4) Date: Nov. 25, 2011

(87) PCT Pub. No.: WO2010/109219
PCT Pub. Date: Sep. 30, 2010

(65) Prior Publication Data
US 2012/0103719 A1  May 3, 2012

(30) Foreign Application Priority Data
Mar. 23, 2009 (GB) .................................. 0904866.1

(51) Int. Cl.
*F01N 1/02* (2006.01)
*F01N 1/08* (2006.01)
*F01N 1/10* (2006.01)

(52) U.S. Cl.
USPC .......................................... 181/251; 181/257

(58) Field of Classification Search
USPC ......... 181/251, 248, 252, 256, 257, 258, 267, 181/268, 274, 249, 255, 253, 269, 275, 272
See application file for complete search history.

(56) References Cited

U.S. PATENT DOCUMENTS

| | | | | |
|---|---|---|---|---|
| 1,510,791 A * | 10/1924 | Martel | ........................... | 181/273 |
| 1,984,707 A * | 12/1934 | Sommer | ........................ | 181/275 |
| 2,205,899 A * | 6/1940 | Chipley | ......................... | 181/269 |
| 2,213,614 A * | 9/1940 | Scarritt | .......................... | 181/255 |
| 2,216,763 A * | 10/1940 | Boyce | ............................. | 96/386 |
| 2,287,412 A * | 6/1942 | Bourne | ........................ | 181/272 |
| 2,553,326 A * | 5/1951 | Manning | ........................ | 96/387 |
| 2,624,418 A * | 1/1953 | Bourne | .......................... | 181/251 |
| 2,707,525 A * | 5/1955 | Janeway | ........................ | 181/268 |
| 2,937,707 A * | 5/1960 | Ernst | ............................... | 181/252 |
| 2,958,388 A * | 11/1960 | Paulsen | ......................... | 181/256 |
| 2,990,906 A * | 7/1961 | Audette | ........................ | 181/256 |
| 2,993,559 A * | 7/1961 | Everett | ......................... | 181/268 |
| 3,016,972 A * | 1/1962 | Dugas | ............................ | 181/268 |
| 3,113,635 A * | 12/1963 | Allen et al. | ................... | 181/252 |
| 3,114,431 A * | 12/1963 | Sanders | ......................... | 181/256 |
| 3,174,583 A * | 3/1965 | Giordano | ....................... | 181/252 |
| 3,454,129 A * | 7/1969 | Everett | ......................... | 181/268 |
| 3,470,979 A * | 10/1969 | Everett | ......................... | 181/268 |
| 3,642,095 A * | 2/1972 | Fujii | ............................. | 181/271 |
| 3,957,133 A * | 5/1976 | Johnson | ......................... | 181/256 |

(Continued)

FOREIGN PATENT DOCUMENTS

| | | |
|---|---|---|
| BE | 1 009 454 | 3/1997 |
| DE | 100 09 124 | 12/2011 |

(Continued)

*Primary Examiner* — Edgardo San Martin
(74) *Attorney, Agent, or Firm* — Adam Warwick Bell; Matthew Kaser

(57) ABSTRACT

An exhaust muffler comprising an inlet in fluid communication with an outlet via an expansion chamber (16), the expansion chamber (16) comprising an inner core (22) extending in the longitudinal direction, wherein the muffler is provided with at least one accelerator (24*a*) tube between the inlet and the expansion chamber. The disclosure extends to a catalytic converter of a similar construction.

13 Claims, 3 Drawing Sheets

(56) References Cited

U.S. PATENT DOCUMENTS

| | | | | |
|---|---|---|---|---|
| 3,966,016 A * | 6/1976 | Hecht | | 181/269 |
| 4,006,793 A | 2/1977 | Robinson | | |
| 4,045,157 A * | 8/1977 | Peterson | | 431/114 |
| 4,064,962 A * | 12/1977 | Hunt | | 181/272 |
| 4,108,276 A * | 8/1978 | Hall et al. | | 181/256 |
| 4,162,904 A * | 7/1979 | Clay et al. | | 96/381 |
| 4,203,503 A * | 5/1980 | Franco et al. | | 181/272 |
| 4,228,868 A * | 10/1980 | Raczuk | | 181/247 |
| 4,263,982 A | 4/1981 | Feuling | | 181/256 |
| 4,382,487 A * | 5/1983 | Baumann | | 181/282 |
| 4,485,890 A * | 12/1984 | Harris et al. | | 181/280 |
| 4,601,363 A | 7/1986 | Harris et al. | | |
| 4,693,337 A * | 9/1987 | Timmermeister | | 181/231 |
| 4,924,966 A * | 5/1990 | Kanda et al. | | 181/228 |
| 5,183,976 A | 2/1993 | Plemons | | |
| 5,198,625 A * | 3/1993 | Borla | | 181/248 |
| 5,248,859 A * | 9/1993 | Borla | | 181/238 |
| 5,457,290 A * | 10/1995 | Sase et al. | | 181/258 |
| 6,082,488 A * | 7/2000 | Lin | | 181/256 |
| 6,116,377 A * | 9/2000 | Dugan | | 181/272 |
| 6,302,236 B1 * | 10/2001 | Choyce | | 181/272 |
| 6,332,511 B1 * | 12/2001 | Parlato et al. | | 181/282 |
| 6,520,286 B1 * | 2/2003 | Frederiksen et al. | | 181/256 |
| 6,799,657 B2 * | 10/2004 | Daniels | | 181/252 |
| 6,868,939 B2 * | 3/2005 | Ziehl | | 181/256 |
| 6,935,461 B2 * | 8/2005 | Marocco | | 181/270 |
| 7,044,266 B2 * | 5/2006 | Petracek | | 181/269 |
| 7,117,973 B2 * | 10/2006 | Graefenstein | | 181/253 |
| 7,445,083 B2 * | 11/2008 | Wu | | 181/269 |
| 2002/0106312 A1 | 8/2002 | Harris | | |
| 2005/0262835 A1 * | 12/2005 | Chrisman et al. | | 60/299 |
| 2006/0070375 A1 | 4/2006 | Blaisdell | | |
| 2006/0242952 A1 | 11/2006 | Muramatsu et al. | | |
| 2007/0039316 A1 | 2/2007 | Bosanec | | |
| 2011/0005856 A1 * | 1/2011 | Larson | | 181/211 |

FOREIGN PATENT DOCUMENTS

| | | | | | |
|---|---|---|---|---|---|
| FR | 2678681 A1 * | 1/1993 | | | F01N 1/00 |
| JP | 54137530 A * | 10/1979 | | | F01N 1/04 |
| JP | 61207814 A * | 9/1986 | | | F01N 1/00 |
| JP | 05288047 A * | 11/1993 | | | F01N 3/24 |
| JP | 06207511 A * | 7/1994 | | | F01N 3/34 |
| KR | 100 846 319 | 7/2008 | | | |
| WO | WO 96/09893 | 4/1996 | | | |
| WO | WO 97/43528 | 11/1997 | | | |
| WO | WO 99/35378 | 7/1999 | | | |
| WO | WO 03/056223 | 7/2003 | | | |
| WO | WO 2007/110002 | 10/2004 | | | |

* cited by examiner

EXHAUST FILTER

RELATIONSHIP TO OTHER APPLICATIONS

This application is a U.S. National Phase Application filed under 35 U.S.C. 371 of PCT Application PCT/GB2010/050474 and claims the benefit of and priority to UK application No. 0904866.1 filed 23 Mar. 2009. All of which preceding applications is hereby incorporated by reference in its entirety for all purposes.

FIELD OF THE INVENTION

This invention relates to an improved exhaust filter, especially for use with internal combustion engines, and more especially to an exhaust muffler and an exhaust catalytic converter.

BACKGROUND TO THE INVENTION

During combustion in internal combustion engines, exhaust gases are produced which contain, among other things, nitrogen oxides, NOx, which are harmful to humans. These gases are channeled away from the engine by way of an exhaust system. In addition to the fumes that are produced during combustion of fuel in an internal combustion engine, a relatively large amount of noise is also generated and the sound waves pass through the exhaust system with the exhaust gases. The noise generation requires muffling in order to meet current regulations relating to noise pollution.

Previously proposed muffling systems use baffles and expansion chambers positioned along the exhaust pipe to dampen the sound. A problem with such an arrangement is that temperature gradients are created which leads to backpressures being created in the exhaust manifold, which, in turn leads to an increase in temperature in the exhaust manifold. The backpressure acts as a resisting force against the pistons and crankshaft, which reduces the efficiency of the engine. The backpressure varies according to the amount of exhaust gas being produced, which is a function of the number of revolutions of the engine.

When a vehicle is started, it takes some time for a catalytic converter on that vehicle to heat up to a temperature at which it operates efficiently. Current catalytic converters take some time to heat up to the required temperature when the vehicle is started.

There is an underlying desire to produce an exhaust filter that reduces harmful emissions and improves fuel economy, whilst also reducing the noise pollution and reduces the backpressure, which in turn improves engine torque, power and efficiency.

SUMMARY OF THE INVENTION

Accordingly, the present invention is directed to an exhaust muffler comprising an inlet in fluid communication with an outlet via an expansion chamber, the expansion chamber comprising an inner core extending in the longitudinal direction, wherein the muffler is provided with at least one accelerator tube between the inlet and the expansion chamber. The accelerator tube increases the velocity of the gases and sound waves as they pass from the inlet into the expansion chamber. This produces a lower pressure at the inlet which allows the back pressure in the exhaust manifold of the engine to be removed more readily, allowing the engine to run more freely. Therefore, the engine can be better tuned, which in turn improves fuel efficiency leading to better combustion of fuel and lower levels of particulates and greater power and torque from the engine, and therefore reduces the carbon footprint of a vehicle, per unit of fuel. The inner core contains filtering material which captures harmful emissions such as NOx and particulates. The length, diameter, position and shape of the accelerator tubes are critical to the muffler's performance, and variations in these will produce specific performance characteristics and enhance scavenging effects which results in improvements in fuel consumption, reduced emission and performance gains. The diameter of the accelerator tubes is dictated by the intended application of the muffler and the size of the exhaust used in that application. Factors to be considered include, the fuel used in the engine, for example petrol or diesel, the cubic capacity of the engine, and the presence of turbo-chargers.

Advantageously, at least one accelerator tube is provided between the expansion chamber and the outlet. The use of an accelerator tube at the outlet end of the expansion chamber accelerates the gases and sound waves as they leave the muffler, creating reducing the gas pressure at the outlet end of the exhaust expansion chamber. This aids in reducing the backpressure in the exhaust manifold.

Preferably, the muffler is outwardly tapered from the inlet towards the expansion chamber and inwardly tapered from the expansion chamber to the outlet. By having the tapering, the flow of the gases is more stable.

In a preferred embodiment, the inner core comprises an inlet gas deflecting cap at the inlet end of the inner core to deflect exhaust gases from the inlet toward the accelerator tubes, and an outlet gas deflecting cap at the outlet end of the inner core. The inlet deflecting cap directs the flow of gases and sound waves towards the accelerator tubes, and the outlet deflecting cap aids with stabilising the gases on exit. It is possible that in some situations the device may have only one deflecting cap.

In one construction, the inlet deflecting cap and the outlet deflecting cap are dome shaped. In an alternative construction, the inlet deflecting cap and the outlet deflecting cap are cone shaped. The size and shape of the cap required depends upon the required flow of gases through the muffler. Different shapes can result in different characteristics for fuel efficiency, the speed of gas and the effect on gas density. The deflecting cap may be other shapes from conical or hemispherical, such as hemi-ellipsoidal, or paraboloidal, depending on the required flow of gases and waves through the muffler. It is preferable that the deflecting caps are the same shape at both ends of the inner core as this has an effect on the stabilisation of the exhaust gas flow.

It is advantageous if the accelerator tubes at the inlet end of the expansion chamber and the outlet end of the expansion chamber are rotationally offset with respect to one another. The performance of the accelerator tubes depends to some extent upon their positioning around the circumference of the inner core. A position for improved effect is to offset the tubes at one end of the inner core by $360/2x°$ in relation to the tubes at the other end, where x is the number of tubes present at each end. Up to eight accelerator tubes may be used at each end of the inner core, although more than four accelerator tubes are only usually used in extended systems.

Preferably, the, or each, accelerator tube extends in the longitudinal direction and arcs around the circumference of the inner core, such that the gas passing through the at least one accelerator tube exits the accelerator tube or tubes in a rifled fashion. By producing a rifled or helical spinning of gases and sounds waves, the gases and waves funnel faster through the annular inner core. This allows exhaust gas to flow relatively rapidly through the expansion chamber and out through the outlet, which reduces the engine exhaust manifold pressure, whilst maintaining the muffling capabilities at levels comparable to that of present mufflers.

Advantageously, the muffler further comprises a central accelerator tube passing through the centre of the inner core. Such a configuration is desirable in very high performance engines of 500 bhp or more, and where a high level of torque is required.

Preferably, the central accelerator tube comprises rifling or vanes to spiral the flow of gas as it passes through the central accelerator tube.

The invention extends to a catalytic converter, comprising an inlet in fluid communication with an outlet via a chamber, the chamber comprising an outer wall and an inner core extending in the longitudinal direction, wherein the inner core is surrounded by a honey-comb structure and is provided with at least one accelerator tube between the inner core and the outer wall, the at least one accelerator tube extending in the same longitudinal direction as the inner core. The use of at least one accelerator tube reduces the backpressure on the engine, which improves the engine efficiency and performance. The heating process within the catalytic converter is achieved more quickly than in existing catalytic converters, which in turn causes faster expansion of the monolithic core and allows chemical reaction to occur earlier than with traditional catalytic converters. The inner core and outer wall may be constructed from stainless steel, which can be heated relatively quickly, allowing the catalytic converter to reach its working temperature quickly. This also allows the core to heat from its centre. Honeycomb is intended to mean a catalyst support matrix, the shape of which may vary and may be, for example, of hexagonal or square cell profile, or another appropriate shape.

Preferably, the inner core comprises an inlet gas deflecting cap at the inlet end of the inner core to deflect exhaust gases from the inlet toward the at least one accelerator tube, and an outlet gas deflecting cap at the outlet end of the inner core. Using deflecting caps reduces the turbulence associated with current catalytic converters and allows a more stable flow of gases from the exhaust. The deflecting caps and accelerator tubes also provide a more constant temperature throughout the monolithic core.

It is advantageous if the converter is provided with muffling material to muffle the sound waves. The catalytic converter can also be used as a muffler by providing muffling material. This also provides insulation to the catalytic converter, which allows it to retain heat for longer periods of time compared to existing converters, which subsequently allows the catalytic properties of the honeycomb structure to come into effect quicker than 'cold' converters. Intervals between trips therefore have a reduced effect of re-heating the converter. A constant temperature throughout the monolithic core is maintained without overheating the core, which increases the life of the catalytic properties of the monolithic core.

In a preferred construction the muffling material is provided within the inner core and the inner core provided with perforations in its outer surface to allow the passage of gas and sound waves.

Advantageously, muffling material is provided at the outer surface of the chamber. By providing a perforated inner lining to the wall and placing muffling material between the perforated lining and the outer wall, the catalytic converter can be used to muffle the sound.

BRIEF DESCRIPTION OF THE DRAWINGS

Embodiments of the present invention will now be described, by way of example only, and with reference to the accompanying drawings, in which.

DETAILED DESCRIPTION OF EXEMPLARY EMBODIMENTS

Figure 1:
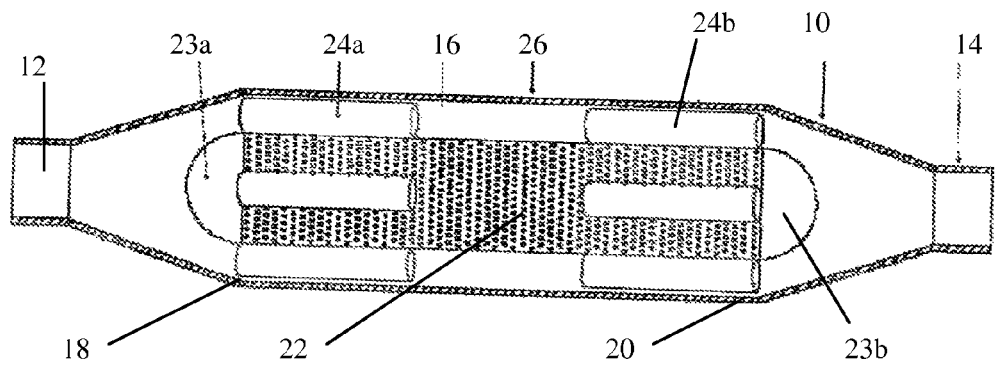
FIG. 1 is a diagram showing an exhaust muffler in accordance with the present invention.

FIG. 1 shows an exhaust muffler 10, comprising an inlet 12 in fluid communication with an outlet 14, via an expansion chamber 16, in the form of a cylindrical body. The fluid passage from the inlet 12 to a first end 18 of the expansion chamber 16 outwardly tapers, that is to say the diameter of the passage increases as it approaches the expansion chamber 16. The fluid passage from the other end 20 of the expansion chamber 16 to the outlet 14 is inwardly tapered, that is to say the diameter of the passage decreases from the other end 20 to the outlet 14.

An inner core 22 is positioned longitudinally within the expansion chamber 16. The inner core 22 comprises a cylindrical stainless steel tube having perforations in the outer surface which allows the passage of gas through the stainless steel into the inner core 22. The inside of the inner core 22 is provided with filtration materials for filtering hydrocarbon particulate and acoustic dampening material for absorbing sound energy. The density and uniformity of the filtering and muffling media are important in terms of the amount of absorption that occurs and the flow of gases and sound waves through the expansion chamber. Special packing techniques may be used to produce a uniform density in the muffler medium.

The two ends of the inner core 22 are provided with removable dome-shaped deflecting caps 23a and 23b, which extend outwardly in the longitudinal direction away from the inner core 22. The deflecting caps 23a and 23b are attached to the inner core 22 by way of a screw-fit connection to allow the materials within the inner core 22 to be replaced as and when necessary. The deflector caps 23a and 23b are symmetrical.

At each end off the inner core 22 is a set of four accelerator tubes 24a and 24b around the circumference of the inner core 22, positioned regularly around the circumference and extending substantially a third of the length of the inner core 22. The accelerator tubes 24a and 24b comprise stainless steel tubing. The first set of accelerator tubes 24a allow communication between the inlet 12 and the expansion chamber 16, and the second set of accelerator tubes 24b allow communication between the expansion chamber 16 and the outlet 14. The outer surface 26 of the muffler 10 comprises a single sheet of stainless steel.

The muffler 10 is generally constructed from stainless steel and is welded such that it is gas-tight, so as to prevent the escape of exhaust fumes from the muffler 10. The muffling and filtration media are materials that are not affected by the high temperatures and flow rates of the exhaust gases. For example, the materials are chosen so as not to be broken down by high temperatures, nor blown out of the exhaust muffler 10 by high flow rates. These may be composite materials such as long strand fibre matting enveloped in a metal gauze sheath, single strand fibres, or other effective sound wave absorbing material.

The accelerator tubes 24 are attached to the inside of the outer surface 26 of the muffler 10 and also to the inner core 22, such that the inner core 22 is securely held centrally within the expansion chamber 16 by the accelerator tubes 24.

The exhaust gases and sound waves enter the muffler 10 through the inlet 12 and are then directed by the deflecting cap 23a into the accelerator tubes 24a. As the gases hit the deflecting cap 23a, there is a momentary increase in temperature which is coupled with a reduction in the gas speed. In addition the density of the gas increases as the gas slows.

The accelerator tubes 24a act as a directional expansion fan. As the gas passes into the accelerator tubes 24a it accelerates to a higher velocity than the gases in the expansion chamber 16. The increased velocity of the gas as it passes through the accelerator tubes 24a reduces the gas temperature and reduces the turbulence of the gas. The gas subsequently passes through the expansion chamber 16 and into the accelerator tubes 24b. The accelerator tubes 24b again accelerate the gas and it passes around the deflecting cap 23b to stabilise the gas before it passes through the outlet 14. Because of the increased gas velocity in the accelerator tubes 24, and therefore decreased pressure within the gas, the exhaust gases are drawn to the tubes 24.

Figure 2:
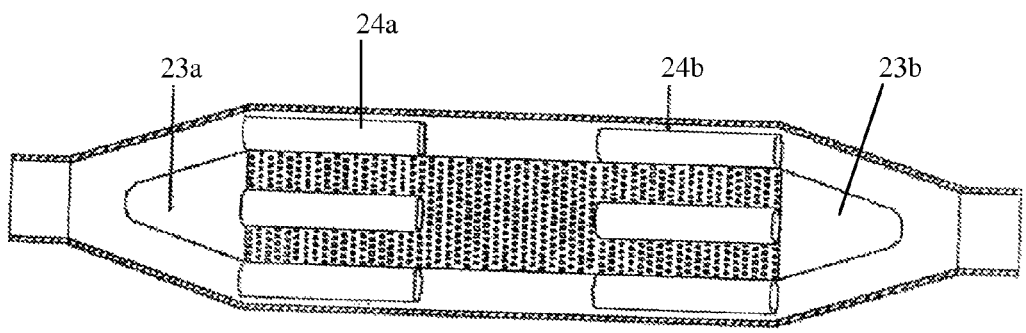
FIG. 2 is a diagram of a second embodiment of an exhaust muffler in accordance with the present invention.

FIG. 2 shows a muffler 10 of a similar construction to that shown in FIG. 1, wherein the deflecting caps 23a and 23b are cone-shaped rather than dome-shaped. The conical shaping of the deflecting caps 23 provides a different level of stabilisation and deflection of the exhaust gases and sound waves entering from the inlet 12 and the exit 14 from the domed-shaped caps of FIG. 1.

Figure 3:
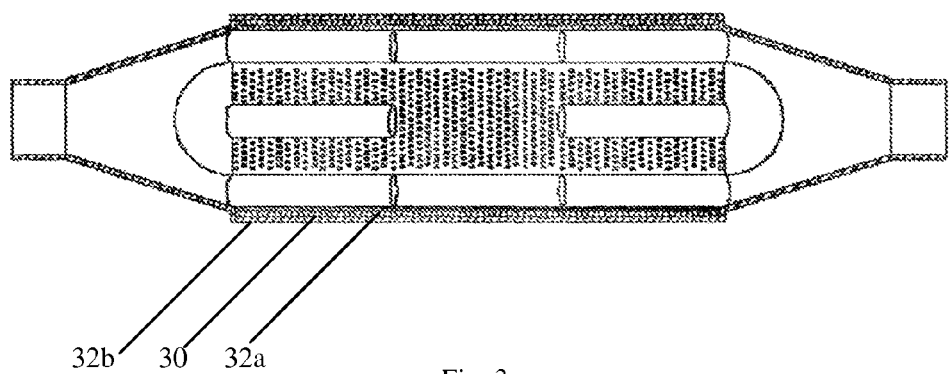
FIG. 3 is a diagram of a third embodiment of an exhaust muffler in accordance with the present invention.

FIG. 3 shows a muffler 10 of a similar construction to that shown in FIG. 1, wherein the outer surface 26 of the muffler 10 comprises a lamina of materials having a layer of particulate filtering material 30 for filtering hydrocarbon particulate or NOx, and/or an acoustic absorbing material for muffling sound, sandwiched between two metal layers 32a and 32b. In this embodiment, the inner layer 32b of the outer surface 26 comprises perforations to allow the exhaust gases to the material layer 30. The perforations in the inner core 22 and the inner layer 32b of the outer surface 26 are sufficiently large to allow the passage of exhaust gas through, but sufficiently small to retain the filtration and/or acoustic material in place.

Figure 4:
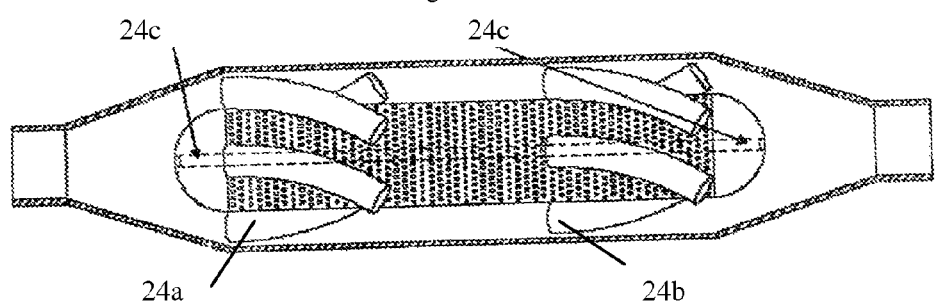
FIG. 4 is diagram of a fourth embodiment of an exhaust muffler in accordance with the present invention.

FIG. 4 shows a muffler 10 of similar construction to that shown in FIG. 1, wherein the accelerator tubes 24 extend in the longitudinal direction and are arced around part of the circumference of the inner core 22. In such a construction, the exhaust gases exiting the accelerator tubes 24 spins in a helical fashion, which allows the gases to funnel through the expansion chamber 16 quicker than if the accelerator tubes 24 are straight along the longitudinal length of the inner core 22.

Figure 4A:
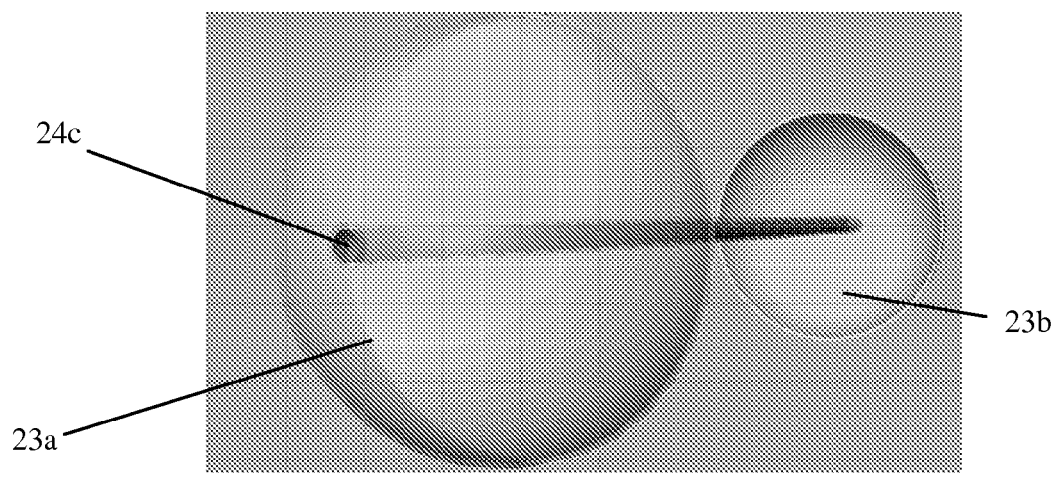
FIG. 4a is a diagram of the deflecting caps and associated central accelerator tube of the embodiment of FIG. 4.

The inner core 22 in this embodiment has a further accelerating tube 24c passing through its centre. The accelerator tube 24c comprises a perforated stainless steel tube having rifling or vanes to twist and spiral the gas as it passes through the tube 24c. FIG. 4a shows more clearly the rifling in the tube 24c. The gasses and sound waves enters through the centre of the deflecting cap 23a, passes through the inner core 22 and exit through the centre of deflecting cap 23b.

Figure 5:
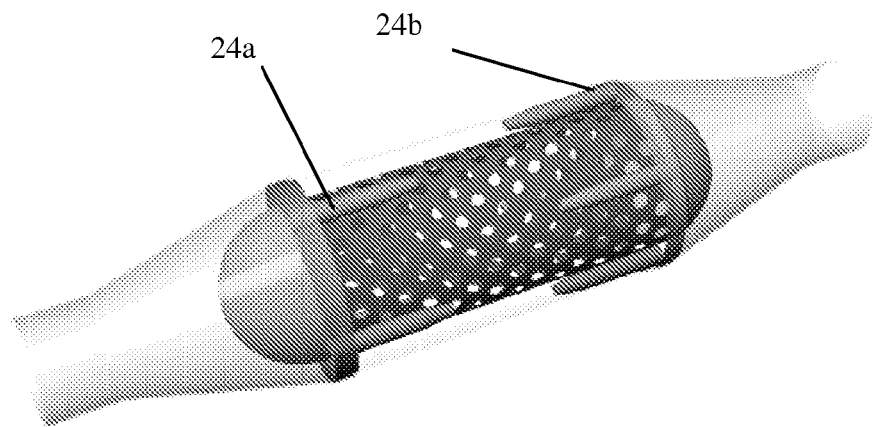
FIG. 5 is a diagram of a fifth embodiment of an exhaust muffler in accordance with the present invention.

FIG. 5 shows a muffler 10 of a similar construction to that shown in FIG. 1, wherein the accelerator tubes 24 have tapered ends. In this embodiment, the accelerator tubes 24a and 24b are rotationally offset with respect to one another.

Figure 6:
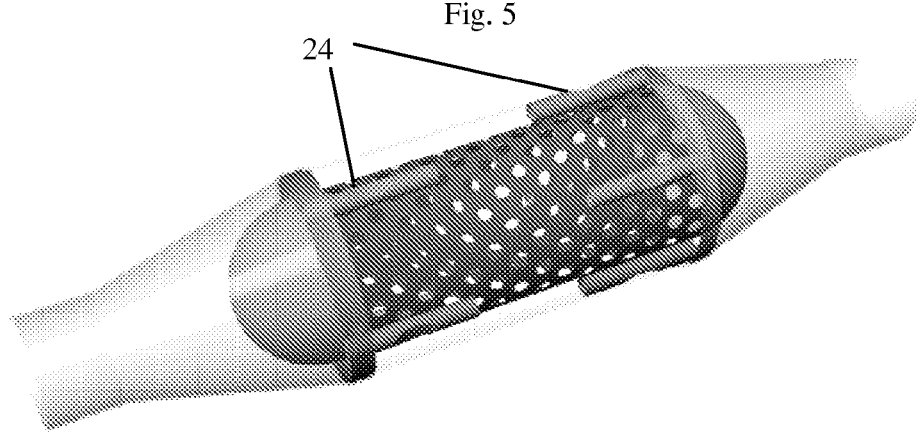
FIG. 6 is a diagram of a six embodiment of an exhaust muffler in accordance with the present invention.

FIG. 6 shows a muffler 10 of a similar construction to that shown in FIG. 1, wherein the accelerator tubes 24 comprise dimples. The tubes 24 may each have more than one dimple along its length. The tapering shown in FIG. 5 and the dimples, or multiple dimples, described in this paragraph may be combined in further variations (not shown).

Figure 7:
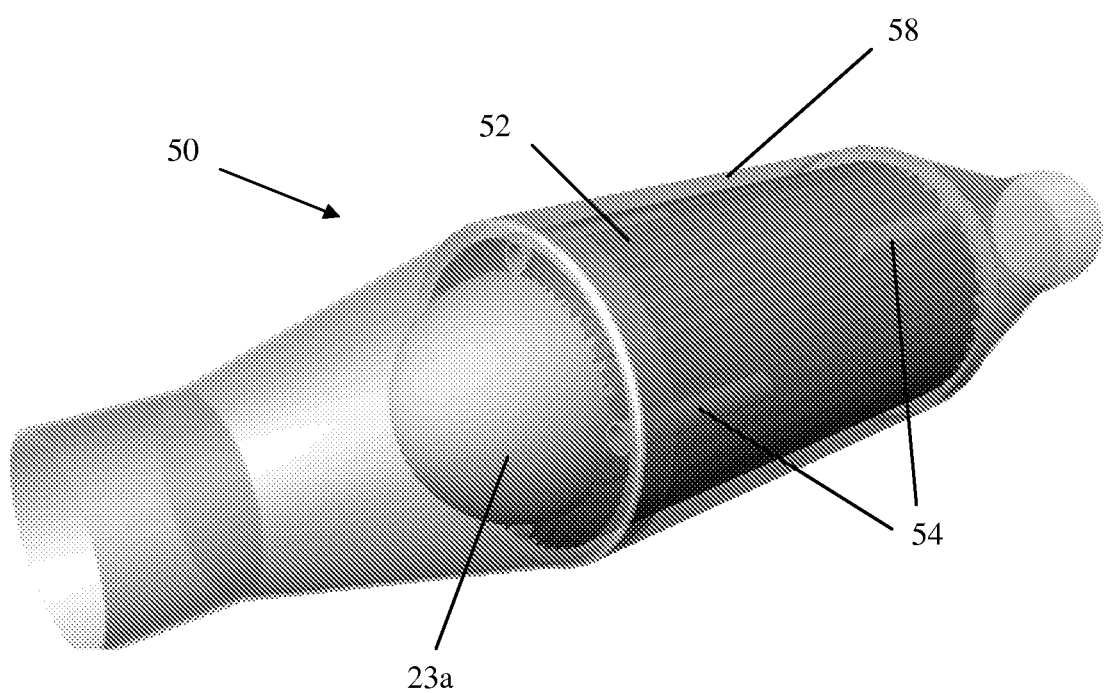
FIG. 7 is a diagram of a honey-comb catalytic converter is accordance with the present invention.

FIG. 7 shows a catalytic converter 50, having a similar construction to the muffler shown in FIG. 1. A layer of monolithic honeycomb material 52 is provided about the inner core of the catalytic converter 50. The honeycomb material comprises ceramic honeycomb structure and metallic corrugated matting, coated with precious metals such as platinum, palladium and rhodium. Four accelerator tubes 54 made from perforated steel are positioned in a longitudinal direction about the circumference of the inner core at each end of the inner core. The deflecting caps 23a and 23b (not shown in FIG. 7) reduce the gas turbulence associated with current catalytic converters.

Muffling material may be placed within the outer wall 58 of the catalytic converter, with a perforated inner wall (not shown) to hold the material in place, such that gases and sound waves can reach the material. By using muffling material that also provides insulation to the catalytic converter, heat may be retained within the catalytic converter. By retaining heat within the converter, the temperature increase required for the catalytic converter to get up to optimum temperature is decreased between shop stops of the vehicle. Alternatively, or addition, muffling material can be placed within the inner core of the catalytic converter.

EXAMPLES

In motorcycle applications the dimensions of the mufflers may be shorter in length than fifty centimeters. They may taper out to an outer dimension diameter of between ten and twelve and a half centimeters in diameter across the body's cross section depending upon the engine output.

In car applications the muffler-filters may be shorter than seventy-five centimeters in length with a standard length of sixty centimeters and between twelve and a half and fifteen centimeters diameter across the cross-section depending on the engine output, with a standard diameter cross-section of twelve and a half centimeters for those without an outer layer of muffling medium.

In truck and public service applications muffler-filters may all be double skinned and have the insulating and muffling lamina between these skins. Dimensions of configurations are a function of the power and torque of individual engines.

In boat applications configurations may include double skinning of the outer wall—lamina—and may be of custom made dimensions depending on the size of the engine or engines.

In tractor and earth moving equipment applications mufflers may be shorter than sixty centimeters in length and with a cross-sectional area less than twenty centimeters but more than twelve and a half centimeters and depending on the engine's output.

In static machinery configurations may vary according to the size of engine or engines in these applications.

In military applications such as tanks where heavy gauge materials may be used in construction. Such mufflers may be retro-fit replacements for the factory fitted original mufflers requiring either bolting or welding into the pipe work of the engine's exhaust system.

The invention is intended for use with internal combustion engines, for example on tractors, earth-moving equipment, boats, gas turbines, static engines and road vehicles, such as cars, motorbikes and lorries. The invention may be retrofitted to existing systems.

For high flow rate exhaust systems, extra muffling or insulation may be required.

The inner core 22 may comprise circular wire gauze. The outer surface 26 may have a thickness of substantially 1 cm, however, this may vary according to the application and desired results.

Numerous other variations and modifications to the illustrated construction may occur to the reader familiar with the art without taking the device outside the scope of the present invention. For example, although the muffler and inner core 22 have been described as being constructed from stainless steel, other materials including steel, composite materials or other metals could be used. Additionally, the deflection cones may be permanently fixed to the inner core and may be constructed from stainless steel with a ceramic coating.

The invention claimed is:

1. An exhaust filter (10) comprising an inlet (12) in fluid communication with an outlet (14) via an expansion chamber (16), the expansion chamber (16) comprising an inner core (22) extending in the longitudinal direction, wherein the filter (10) is provided with at least one accelerator tube (24) between the inlet (12) and the expansion chamber (16), wherein the inner core comprises an inlet gas deflecting cap (23*a*) at the inlet end of the inner core (22) to deflect exhaust gases from the inlet (12) toward the accelerator tubes (24), and an outlet gas deflecting cap (23*b*) at the outlet end of the inner core (22), and in that, the gases pass substantially longitudinally along the length of the filter (10).

2. The exhaust filter (10) according to claim 1, wherein at least one accelerator tube (24) is provided between the expansion chamber (16) and the outlet (14).

3. The exhaust filter (10) according to claim 1, wherein the filter (10) is outwardly tapered from the inlet (12) towards the expansion chamber (16) and inwardly tapered from the expansion chamber (16) to the outlet (14).

4. The exhaust filter (10) according to claim 1, wherein the inlet deflecting cap (23*a*) and the outlet deflecting cap (23*b*) are dome shaped.

5. The exhaust filter (10) according to claim 1, wherein the inlet deflecting cap (23*a*) and the outlet deflecting cap (23*b*) are cone shaped.

6. The exhaust filter (10) according to claim 1, wherein the accelerator tubes (24) at the inlet end of the expansion chamber (16) and the outlet end of the expansion chamber (16) are rotationally offset with respect to one another.

7. The exhaust filter (10) according to claim 1, wherein the, or each, accelerator tube (24) extends in the longitudinal direction and arcs around the circumference of the inner core (22), such that the gas passing through the at least one accelerator tube (24) exits the accelerator tube or tubes (24) in a rifled fashion.

8. The exhaust filter (10) according to claim 1, wherein the filter (10) further comprises a central accelerator tube (24*c*) passing through the centre of the inner core (22).

9. The exhaust filter (10) according to claim 8, wherein the central accelerator tube (24*c*) comprises rifling or vanes to spiral the flow of gas through as it passes through the central accelerator tube (24*c*).

10. The exhaust filter (10) according to claim 1, wherein the filter (10) is a particulate filter.

11. The exhaust filter (10) according to claim 1, wherein the filter (10) is provided with muffling material to muffle sound waves.

12. The exhaust filter (10) according claim 1, wherein the filter (10) is a catalytic converter.

13. The exhaust filter (10) according to claim 12, wherein the filter (10) is provided with a monolithic honey-comb structure.

* * * * *